United States Patent [19]

Thrower

[11] Patent Number: 4,756,766

[45] Date of Patent: Jul. 12, 1988

[54] METHOD OF CLEANING AND CONDITIONING SURFACES

[75] Inventor: John H. Thrower, Charlotte, N.C.

[73] Assignee: Hertron International, Inc., Charlotte, N.C.

[21] Appl. No.: 46,762

[22] Filed: May 7, 1987

[51] Int. Cl.$^4$ ................................................ B08B 3/08
[52] U.S. Cl. .......................................... 134/3; 134/2; 134/26; 134/28
[58] Field of Search ...................... 134/2, 3, 28, 29, 26

[56] References Cited

U.S. PATENT DOCUMENTS

| | | | |
|---|---|---|---|
| 3,150,007 | 9/1964 | Kovaehy | 134/28 |
| 3,481,879 | 12/1969 | Salomone | 134/28 |
| 4,613,378 | 9/1986 | Christy | 134/29 |

FOREIGN PATENT DOCUMENTS 1036714 8/1983 U.S.S.R. .................................. 134/3

*Primary Examiner*—Asok Pal

[57] ABSTRACT

A process for cleaning and conditioning marble and similar substances whereby a first mixture formed from zinc sulfate solution, an abrasive, and a thickener is used to mechanically and chemically clean and prepare for the reception of a second aqueous solution formed of fluosilicates of the group consisting of the alkaline earth metals and zinc, and a monocarboxylic aliphatic organic acid, such as acetic. The first mixture is applied with buffing means, completely flushed with water, and removed. The second solution is applied and partially removed with buffing means. As a result of these steps, the surface of the treated substance is given a brilliant glass-like finish.

21 Claims, No Drawings

METHOD OF CLEANING AND CONDITIONING SURFACES

BACKGROUND OF THE INVENTION

This invention relates generally to processes for treating calcareous substances such as marble and the like and more specifically concerns the use of a plurality of intimate mixtures and solutions to clean, smooth, condition, and enhance the appearance of such substances.

Various types of materials have been used in the past to clean and maintain calcareous substances, particularly marble; however, this technology has remained at a virtual standstill for the last century.

Polished marble surfaces and particularly marble floors, soon after installation, become defaced, scratched, and otherwise marred by heavy traffic. In an attempt to protect floor surfaces, engineers have turned to waxes, polymers, and synthetic finishes, thus coating the marble with a durable film. Unfortunately, the harsh alkalinity of these coatings and the added alkalinity of strippers that are necessary to remove them cause efflorescence, which further deteriorates the marble.

SUMMARY OF THE INVENTION

It is a primary object of the present invention to provide compositions and a method of application thereof that is capable of bringing out the intrinsic beauty of marble and similar substances and maintaining that appearance for a much longer period of time than is possible using conventional methods.

The process is accomplished by utilizing an appropriate mixture and solution to grind the surface, the amount of such grinding being determined by a number of factors such as condition and color of the marble, depth of scratches, traffic wear, and levelness of the surface. After removing some calcium carbonate, the freshly ground surface is then chemically treated, ultimately transforming a portion of the remaining calcium carbonate into a fluoride derivative. This phase of the process is believed to significantly increase durability, resistance to chipping and scratching, and protection from staining. The end result is a marked reduction in maintenance cost.

Finally, a brilliant glass-like finish is returned to the marble which in most cases is actually deeper than the original quarry-applied finish. The process results in a marble surface which lasts much longer than any surface containing a polymer or synthetic coating and will never require stripping.

The method in particular comprises the steps of forming intimate mixtures, the first of zinc sulfate, an abrasive, and a thickener, and the second of fluosilicates of the group consisting of alkaline earth metals and zinc, both of the mixtures and solutions containing water, applying and removing the first mixture from the surface with flushing and buffing means; and thereafter applying and removing the second mixture by first removing a part as excess and treating the balance with buffing means.

Finally, the invention also includes the mixtures and solutions produced for use in the above-described method.

DESCRIPTION OF PREFERRED EMBODIMENT

In accordance with the invention, the first intimate mixture consists of essentially zinc sulfate, an abrasive such as from 500 to 800 grit silicon carbide, and a discretionary amount of a thickener to gel which increases the viscosity of the solution. The solution is then applied to the marble surface to be treated and effectively opens the pores of that surface and prepares it for a second application. This mixture-coated surface is then buffed with a buffer utilizing a nylon pad. After the first mixture-coated surface has been buffed, the floor is cleaned and allowed to dry.

A second intimate mixture is prepared which consists essentially of an aqueous fluosilicate of the group consisting of the alkaline earth metals and zinc, and monocarboxylic aliphatic organic acid, such as acetic. The mixture is thinly applied on the marble surface, covering only small sections of that surface during each application until the entire surface has been treated. After the solution has been applied to a small section, while still damp that section is then necessarily buffed with a heavy buffer which applies a force of from 0.5 to 1.0 pounds per square inch against the surface. From this buffing, the marble sheen appears. By comparison, a normal floor buffer applies a pressure of approximately 0.2 pounds per square inch against the surface it is polishing which is insufficient to fully develop the desired chemical reaction.

The following example illustrates the invention.

EXAMPLE

A first mixture is formed containing 6 pounds of zinc sulfate, 4 fluid ounces of a non-ionic surfactant such as Tergitol NP 10, 1.0 pound of xanthan gum, 16 pounds of 500 mesh silicon carbide grit, and 5 gallons of water. The solution is applied to the marble surface, clears the pores of the marble, and prepares it for a second mixture.

A second mixture is formed from 7 pounds of magnesium fluorosilicate, 2 pounds of zinc fluorosilicate, 8 fluid ounces of acetic acid, and 4 fluid ounces of Tergitol NP 10, all mixed with 80.0 pounds of water. After mixture, it is applied sequentially to small areas and, while still damp, partially removed from each area by buffing means before the next area is coated.

After cleaning and smoothing the marble surface, prior surface-enhancing methods have been based principally upon reacting calcium hydroxide (lime) with fluorosilicates to form a coating on the surface. The present invention causes the removal of essentially all of the calcium hydroxide with zinc sulfate and therefore does not leave a lime residue on the surface, although, of course, there does remain a residue within the material itself. The sheen and coloring brought forth in the marble surface from the present invention result directly from the removal of calcium hydroxide. The chemical equation representing the zinc sulfate treatment and the introduction of acetic acid is:

$$ZnSO_4 + Ca(OH)_2 \rightarrow CaSO_4 \downarrow + Zn(OH)_2 \downarrow$$

Enhancement of the surface is also brought about by the use of magnesium fluorosilicate, zinc fluorosilicate and acetic acid which, in addition to producing valuable calcium ions, also etches the marble surface, thereby enabling a strong bond to be formed.

The acetic acid acidified fluorosilicates are very finely sprayed onto the marble surface and immediately spread with a steel-wool pad under a buffing machine. The pressure of the machine must be between 0.5 to 1.0 pounds per square inch to produce sufficient surface mixing to allow the desired chemical reactions to take place and leave a thin calcium fluorosilicate film. The objective is to produce a thin, transparent, tough, scratch-resistant, hard, inorganic film as a base as opposed to applying a temporary organic coating of wax or the like as is done in conventional applications. The simultaneous chemical reactions representing the development of the fluorosilicates are:

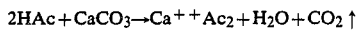

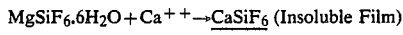

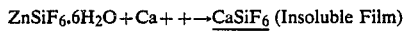

A process similar in nature to that disclosed above can be used in those instances where the marble surface is not radically worn or where the previously described process has been used one to two years previously and a lesser application is needed to bring the marble surface to a suitable finish. Such an application can be formulated by the following chemical process:

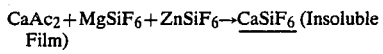

Sequentially applied aqueous solutions to the marble surface of calcium acetate and aqueous solutions of magnesium and/or zinc silicafluorides reacting with buffing means will function satisfactorily to restore the depth of gloss of the marble and otherwise enhance its appearance.

While the example in this application includes the preferred use of a combination of magnesium and zinc fluosilicates in an 80:20 ratio, either can be used alone because they both will react with the calcium ions in the calcium acetate to produce an insoluble calcium fluorosilicate film. The calcium fluorosilicate film produced from calcium acetate solution and either zinc fluorosilicate or magnesium fluorosilicate alone is satisfactory, but the marble colors developed are not as deep or as dark as when using the combination of zinc fluorosilicate and magnesium fluorosilicate blended together. The only compensation that must be made to make either work alone is to compensate for the molecular weight differences between zinc and magnesium compounds. For example, one pound of $ZnSiF_6 \cdot 6H_2O$ is chemically equivalent to 0.87 pound of the $MgSiF_6 \cdot 6H_2O$ and can be interchanged by that ratio.

Costs associated with the application of the present invention are about 50% below those associated with conventional wax, stripping and buffing operations.

Although the present invention has been described in some detail by way of illustration and example for purpose of clarity of understanding, it is understood that certain changes and modifications may be made within the spirit of the invention and the scope of the appended claims.

What is claimed is:

1. A coating, cleaning, and conditioning process for marble comprising the steps of: applying a first mixture consisting essentially of zinc sulfate, an abrasive, a thickner, and a wetting agent to the surface to be treated; removing the mixture with buffing means and water; applying a second mixture consisting essentially of fluorosilicates of the group consisting of the alkaline earth metals and zinc, and monocarboxylic aliphatic organic acid and a wetting agent to the surface to be treated; and partially removing the second mixture with buffing means to form a insoluable film of calcium fluorosilicate that restores the depth of gloss of the marble.

2. The process as claimed in claim 1 wherein the first mixture buffing means includes a buffing machine and a nylon pad for contacting the first mixture-coated surface to be treated.

3. The process as claimed in claim 1 wherein the second mixture buffing means includes a buffer capable of exerting from 0.5 to 1 pound per square inch against the second mixture-coated surface to be treated.

4. The process as claimed in claim 1 wherein the second mixture is thinly applied over small sections of the surface to be treated and, while still damp, partially removed by buffing means from each small section before being applied to another section.

5. The process as claimed in claim 1 wherein the surface to be treated is cleaned and dried after the first mixture is removed and before the second mixture is applied.

6. The process as claimed in claim 1 wherein the first mixture contains from 0.5 to 1.7 pounds of zinc sulfate and from 1 to 3 pounds of abrasive per gallon of water.

7. The process as claimed in claim 1 wherein the second mixture contains from 0.4 to 0.8 pound of magnesium fluorosilicate and from 0.1 to 0.2 pound of zinc fluorosilicate per gallon of water.

8. The process as claimed in claim 1 wherein the second mixture contains from 0.5 to 1.0 pound of magnesium fluorosilicate per gallon of water.

9. The process as claimed in claim 1 wherein the second mixture contains from 0.6 to 1.0 pound of zinc fluorosilicate per gallon of water.

10. The process as claimed in claim 1 wherein the abrasive in the first mixture is from 500 to 800 grit silicon carbide abrasive.

11. The process as claimed in claim 1 wherein the thickener is xanthan gum.

12. The process as claimed in claim 2 wherein the second mixture buffing means includes a buffer capable of exerting from 0.5 to 1.0 pound per square inch against the second mixture-coated surface to be treated.

13. The process as claimed in claim 12 wherein the second mixture is thinly applied over small sections of the surface to be treated and allowed to be chemically reacted and partially removed from each small section before being applied to another section.

14. The process as claimed in claim 13 wherein the surface to be treated is cleaned and dried after the first mixture is removed and before the second mixture is applied.

15. The process as claimed in claim 14 wherein the first mixture contains from 0.5 to 1.7 pounds of zinc sulfate and from 1.0 to 3.0 pounds of abrasive per gallon of water.

16. The process as claimed in claim 13 wherein the second mixture contains from 0.4 to 0.8 pound of magnesium fluorosilicate and from 0.1 to 0.2 pound of zinc fluorosilicate per gallon of water.

17. The process as claimed in claim 13 wherein the second mixture contains from 0.5 to 1.0 pound of magnesium fluorosilicate per gallon of water.

18. The process as claimed in claim 13 wherein the second mixture contains from 0.5 to 1.0 pound of zinc fluorosilicate per gallon of water.

19. The process as claimed in claim 11 wherein the abrasive in the first mixture is from 500 to 800 grit.

20. The process as claimed in claim 19 wherein the thickener is a discretionary amount of xanthan gum.

21. The process as claimed in claim 1 wherein the wetting agent is non-ionic.

* * * * *